(12) United States Patent
Skantze et al.

(10) Patent No.: US 6,722,574 B2
(45) Date of Patent: Apr. 20, 2004

(54) BUSINESS CARD

(75) Inventors: Kristofer Skantze, Lund (SE); Jan Andersson, Sunny Vale, CA (US)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 09/947,475

(22) Filed: Sep. 7, 2001

(65) Prior Publication Data

US 2002/0053596 A1 May 9, 2002

Related U.S. Application Data (60) Provisional application No. 60/261,922, filed on Jan. 16, 2001.

(30) Foreign Application Priority Data

Sep. 7, 2000 (SE) ................................................ 0003195

(51) Int. Cl.[7] .............................................. G06K 19/06
(52) U.S. Cl. ...................................... 235/494; 235/487
(58) Field of Search ................................. 235/494, 487

(56) References Cited

U.S. PATENT DOCUMENTS

| | | |
|---|---|---|
| 5,483,052 A | 1/1996 | Smith, III et al. |
| 5,652,412 A | 7/1997 | Lazzouni et al. |
| 5,932,863 A | 8/1999 | Rathus et al. |
| 6,050,490 A | 4/2000 | Leichner et al. |
| 6,076,734 A | 6/2000 | Dougherty et al. |
| 6,330,976 B1 | 12/2001 | Dymetman et al. |
| 6,499,665 B1 * | 12/2002 | Meunier et al. ............ 235/483 |
| 6,609,653 B1 | 8/2003 | Lapstun et al. |

FOREIGN PATENT DOCUMENTS

| | | |
|---|---|---|
| CN | 1 245 935 | 3/2000 |
| DE | 4 436 700 | 2/1996 |
| GB | 2 268 442 A | 1/1994 |
| WO | 98/20446 | 5/1998 |
| WO | 99/50787 | 10/1999 |
| WO | WO 00 72110 A2 | 11/2000 |
| WO | 00/73983 A1 | 12/2000 |
| WO | WO 01 22357 | 3/2001 |
| WO | 01/26032 A1 | 4/2001 |
| WO | 01/61449 A2 | 8/2001 |

\* cited by examiner

*Primary Examiner*—Harold I. Pitts
(74) *Attorney, Agent, or Firm*—Birch, Stewart, Kolasch & Birch, LLP (57) ABSTRACT

A business card and a pen, which is adapted to detect a position-coding pattern on the business card and calculate a coordinate by means of the pattern. When activating a send box by means of the pen, a computer sends a .vcf file containing the card holder's particulars to a card recipient belonging to the pen holder. When using an optional pen, the .vcf file is sent to a recipient indicated on the keypad of a mobile phone or written on the business card in associated fields or marked in other manners. The pen communicates with a computer wirelessly, for instance via Bluetooth, mobile phone and the Internet. Additional information can be drawn on the back of the business card and be attached to the transmission, such as date and time for the next meeting, a small drawing or sketch etc.

26 Claims, 5 Drawing Sheets

Christer Fåhreous
CEO

Anoto AB
Phone 046-2865850

ANOTO AB
IDEON RESEARCH PARK, SCHEELEVAGEN 15, SE-223 70 LUND, SWEDEN
PHONE:+46 46 286 58 50, FAX:+46 46 286 58 60, www.anoto.com GÖRAN P. ASKETORP
PATENT COUNSEL, EUROPEAN PATENT ATTORNEY
DIRECT:+46 46 286 34 35
MOBILE:+46 708 10 58 68
goran.asketorp@anoto.com

SEND MESSAGE TO CARDHOLDER'S MAILBOX (MARK THE BOX WITH ONE HORIZONTAL STROKE)

BUSINESS CARD

This application claims the benefit of Provisional application Ser. No. 60/261,922, filed Jan. 16, 2001.

FIELD OF THE INVENTION

The present invention relates to the field of business cards.

PRIOR ART TECHNIQUE

Business cards are frequently used in business contacts to communicate particulars about the company and especially personal particulars about the card holder. These particulars are also stored digitally in personal computers or PDAs (Personal Digital Assistant) in programs of the type Microsoft Outlook.

The business cards are also designed to arouse a specific feeling in the recipient, e.g. to provoke a feeling of reliability, rapidness, efficiency etc. of the company represented by the holder of the business card. Such qualities are often conveyed with the aid of trademarks and various graphical means, such as paper quality (coated paper etc.), logotypes, colors, font, layout etc.

For people with a wide circle of business contacts, the collection of business cards will quickly be large. A great number of aids for organizing and managing collection of business cards are presently available.

In many cases the recipient of the business card wants the particulars of the business card to be transferred to his own computer. This means that the particulars must be converted from analog to digital format.

Thus scanners are available which are particularly dedicated to reading business cards and subjecting the particulars to OCR (Optical Character Recognition) and transferring them to a standard format for automatic inputting into a computer program. The problem that arises is that the optical character recognition is often unreliable or completely useless owing to the fact that certain particulars, such as telephone number and e-mail address, on the business card are printed using a very small font. Furthermore, the use of logotypes and figurative marks may cause problems to the OCR program.

Another possibility is using communication between portable computers or PDAs which often have an IR communication port. If an owner of a PDA directs his PDA to a recipient's PDA and presses a button, the business card particulars are transferred in digital format, a "digital business card", from the transmitting PDA to the receiving PDA. This technique is today used by, for example, Palm Pilot.

The technology has not become generally accepted owing to, inter alia, compatibility problems, i.e. both the business card holder and the recipient must have the same type of PDA, or at least PDAs that are compatible. Nor will a visible piece of evidence be obtained that the particulars have been transferred except that shown on the display, since such digital business cards are fully standardized, they cannot communicate a special feeling to the recipient, which is one of the important functions of business cards. Therefore, ordinary business cards are often used parallel with the above-mentioned "digital" business cards.

There is thus a need for a technique which combines the communication of the traditional business card with the digital transfer of particulars, but without the drawbacks caused by optical character recognition.

SUMMARY OF THE INVENTION

The present invention aims at solving this problem by providing a business card which is designed as a traditional business card, but where the business card particulars can be transferred to the recipient in digital format in a smooth fashion, without optical character recognition.

When handing over a business card, the recipient often writes a few notes or makes sketches on the back of the card. For the recipient and the card holder to have the same information, it would be of interest if these notes were copied to the card holder. However in most cases there is no copying machine around, which usually means that the information is not duplicated, and the card holder tries to remember the information and write it down later, which sometimes does not take place.

There is thus a need for an automatic copying function which sends the information written on the back of the business card to the card holder, while the card recipient keeps the business card with the same information.

The business card recipient keeps the business card with the information written on the back to be used on a later occasion. However, it sometimes happens that business cards disappear, along with the information.

In a further development of the invention, it would be of interest that the same information was sent to the business card holder as well as the business card recipient, whereby the disappearance of the physical business card will be of no import.

The information taken down can have the character of a fixed meeting, indicating time and place. The back of the business card can have a form to be filled in with this information in particular boxes. This can also be used by, for example, dentists to indicate the next appointment. A further example is that the business card can have check boxes for preselected alternatives, such as sending a product brochure or a standard-type non-disclosure agreement (NDA).

It may be of interest to forward the information which has been taken down as an e-mail, and then the e-mail address must be stated to which the information is to be forwarded. If the information is to be sent to the card holder, the particulars on the card can be used, but if the information is to be sent to an optional recipient, or to a fax with a special telephone number, this must be indicated on the business card and interpreted, usually subjected to optical character recognition or intelligent character recognition. The business card may then be provided with special fields, which facilitate intelligent character recognition, a so-called comb containing boxes or partitions within which one and only one character, such as a digit or a letter, is allowed. Such "combs" can be positioned along the side edges of the card on its back.

In the case where information is transmitted by means of a mobile phone or a PDA, the keypad of the mobile phone can be used to indicate fax number or e-mail address. Alternatively, the address book particulars of the mobile phone can be used, if they have been inputted, or are inputted in situ. A further alternative is the corresponding activity while using the inputting device of a PDA etc.

According to the present invention, information is transmitted using a position-coding pattern, which is printed on part of the front and/or back of the business card or the entire front and/or back of thereof. A reading pen provided with a reader for the pattern is used to read the information according to the pattern. One example of a pattern and a reading pen which enable the above-mentioned functions is described in Swedish Patent Applications Nos 9901954-9 and 9903541-2, which have been assigned to the Applicant.

Further objects, features and advantages of the invention are evident in more detail from the following detailed description of different embodiments of the invention with reference to the drawings.

DETAILED DESCRIPTION OF EMBODIMENTS OF THE INVENTION

First a position-coding pattern will be described, which is used according to the invention with reference to FIGS. 1, 2 and 3. Then a handheld device in the form of a pen is described, which can be used to write on the business card according to the invention with reference FIG. 4.

Figure 1:
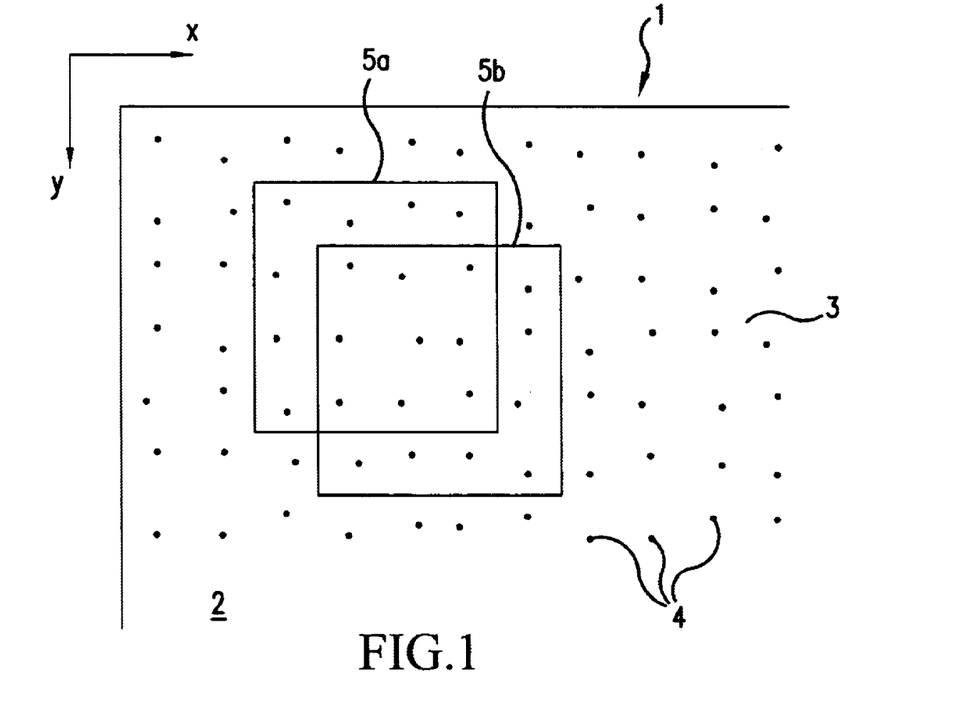
FIG. 1 is a schematic view of an embodiment of a product which is provided with a position-coding pattern.
Figure 2:
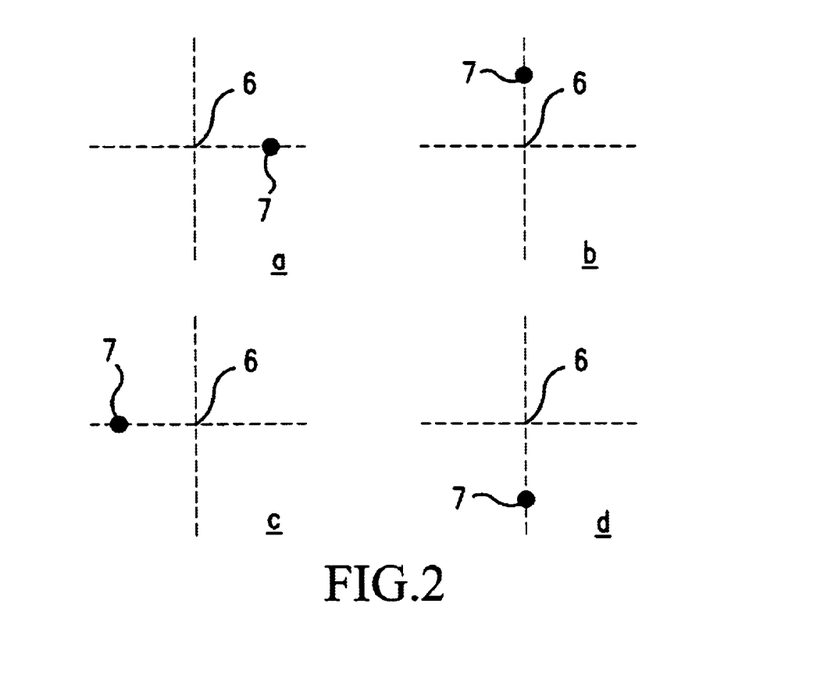
FIG. 2 is a schematic view of how the symbols can be designed in an embodiment of the invention.

FIG. 1 shows a part of a product in the form of a sheet of paper 1, which on its surface 2 is provided with an optically readable position-coding pattern 3 enabling position determination. The position-coding pattern consists of symbols 4 which are systematically arranged across the surface 2, so as to make its appearance "patterned". The sheet has an x-coordinate axis and a y-coordinate axis. In this case, position determination can be carried out on the entire surface of the product. In other cases, the surface allowing position determination may consist of a smaller part of the product. For example, the sheet of paper can be used to produce an electronic representation of information which is being written or drawn on the surface. The electronic representation can be produced by continuously determining, while writing on the surface with a pen, the position of the pen on the sheet by reading the position-coding pattern.

The position-coding pattern comprises a virtual raster, which thus neither is visible to the human eye nor can be detected directly by a device which is to determine positions on the surface, and a plurality of symbols 4, which each are capable of assuming one of four values "1"14 "4" as will be described below. It should here be emphasized that, for the sake of clarity, the position-coding pattern in FIG. 1 has been enlarged to a considerable extent. Moreover, the position-coding pattern is shown only on part of the sheet.

The position-coding pattern is arranged in such manner that the position of a partial surface on the writing surface is coded by the symbols on this partial surface. A first and a second partial surface 5a, 5b are indicated by solid lines in FIG. 1. That part of the position-coding pattern (in this case 4×4 symbols) which is to be found on the first partial surface 5a codes a first position, and that part of the position-coding pattern which is to be found on the second partial surface 5b codes a second position. Thus the position-coding pattern is partially shared by the adjoining first and second positions. Such a position-coding pattern is in this application referred to as "floating".

FIGS. 2a–d show an embodiment of a symbol which can be used in the position-coding pattern according to the invention. The symbol comprises a virtual raster point 6 which is represented by the intersection between the raster lines, and a marking 7 which has the form of a dot. The value of the symbol depends on where the marking is located. In the example in FIG. 2, there are four possible locations, one on each of the raster lines extending from the raster points. The displacement from the raster point is equally large for all values. In the following, the symbol in FIG. 2a has the value 1, in FIG. 2b the value 2, in FIG. 2c the value 3 and in FIG. 2d the value 4. Expressed in other words, there are four different types of symbols.

Each symbol can thus represent four values "1–4". This means that the position-coding pattern can be divided into a first position code for the x-coordinate, and a second position code for the y-coordinate. The division is effected as follows:

| Symbol value | x-code | y-code |
|---|---|---|
| 1 | 1 | 1 |
| 2 | 0 | 1 |
| 3 | 1 | 0 |
| 4 | 0 | 0 |

Thus, the value of each symbol is translated into a first digit, in this case bit, for the x-code and a second digit, in this case bit, for the y-code. In this manner, two completely independent bit patterns are obtained. The patterns can be combined to a common pattern, which is coded graphically by means of a plurality of symbols according to FIG. 2.

Each position is coded by means of a plurality of symbols. In this example, use is made of 4×4 symbols to code a position in two dimensions, i.e. an x-coordinate and a y-coordinate.

The position code is made up by means of a number series of ones and zeros which have the characteristic that no sequence of four bits appears more than once in the series. The number series is cyclic, which means that the characteristic also applies when one connects the end of the series to the beginning of the series. Thus a four-bit sequence always has an unambiguously determined position in the number series.

The series can maximally be 16 bits long if it is to have the above-described characteristic for sequences of four bits. In this example, use is, however, made of a series having a length of seven bits only as follows:

"0 0 0 1 0 1 0".

This series contains seven unique sequences of four bits which code a position in the series as follows:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series is written sequentially in columns across the entire surface that is to be coded. The coding is based on the difference or position displacement between numbers in adjoining columns. The size of the different is determined by the position (i.e. with which sequence) in the number series, in which one lets the column begin. More specifically, if one takes the difference modulo seven between on the one hand a number which is coded by a four-bit sequence in a first column and which thus can have the value (position) 0–6, and, on the other hand, a corresponding number (i.e. the sequence on the same "level") in an adjoining column, the result will be the same independently of where along the two columns one makes the comparison. By means of the difference between two columns, it is thus possible to code an x-coordinate which is constant for all y-coordinates.

Since each position on the surface is coded with 4×4 symbols in this example, three differences (having the value 0–6) as stated above are available to code the x-coordinate. Then the coding is carried out in such manner that of the three differences, one will always have the value 1 or 2 and the other two will have values in the range 3–6. Consequently no differences are allowed to be zero in the x-code. In other words, the x-code is structured so that the differences will be as follows: (3–6) (3–6) (1–2) (3–6) (3–6) (1–2) (3–6) (3–6) (1–2) . . . Each x-coordinate thus is coded with two numbers between 3 and 6 and a subsequent number which is 1 or 2. If three is subtracted from the high numbers and one from the low, a number in mixed base will be obtained, which directly yields a position in the x-direction, from which the x-coordinate can then be determined directly, as shown in the example below.

By means of the above described principle, it is thus possible to code x-coordinates 0,1,2 . . . , with the aid of numbers representing three differences. These differences are coded with a bit pattern which is based on the number series above. The bit pattern can finally be coded graphically by means of the symbols in FIG. 2.

In many cases, when reading 4×4 symbols, it will not be possible to produce a complete number which codes the x-coordinate, but parts of two numbers. Since the least significant part of the numbers is always 1 or 2, a complete number, however, can easily be reconstructed.

The y-coordinates are coded according to the same principle as used for the x-coordinates. The cyclic number series is repeatedly written in horizontal rows across the surface which is to be position-coded. Just like in the case of the x-coordinates, the rows are allowed to begin in different positions, i.e. with different sequences, in the number series. However, for y-coordinates one does not use differences but codes the coordinates with numbers that are based on the starting position of the number series on each row. When the x-coordinate for 4×4 symbols has been determined, it is in fact possible to determine the starting positions in number series for the rows that are included in the y-code in the 4×4 symbols. In the y-code the most significant digit is determined by letting this be the only one that has a value in a specific range. In this example, one lets one row of four begin in the position 0–1 in the number series to indicate that this row relates to the least significant digit in a y-coordinate, and the other three begin in the position 2–6. In y-direction, there is thus a series of numbers as follows: (2–6) (2–6) (2–6) (0–1) (2–6) (2–6) (2–6) (0–1) (2–6) . . . Each y-coordinate thus is coded with three numbers between 2 and 6 and a subsequent number between 0 and 1.

If 0 is subtracted from the low number and 2 from the high, one obtains in the same manner as for the x-direction a position in the y-direction in mixed base from which it is possible to directly determine the y-coordinate.

With the above method it is possible to code 4×4×2=32 positions in x-direction. Each such position corresponds to three differences, which gives 3×32=96 positions. Moreover, it is possible to code 5×5×5×2=250 positions in y-direction. Each such position corresponds to 4 rows, which gives 4×250=1000 positions. Altogether it is thus possible to code 96000 positions. Since the x-coding is based on differences, it is, however, possible to select in which position the first number series begins. If one takes into consideration that this first number series can begin in seven different positions, it is possible to code 7×96000=672000 positions. The starting position of the first number series in the first column can be calculated when the x-coordinate has been determined. The above-mentioned seven different starting positions for the first series may code different sheets of paper or writing surfaces on a product.

With a view to further illustrating the invention according to this embodiment, here follows a specific example which is based on the described embodiment of the position code.

Figure 3:
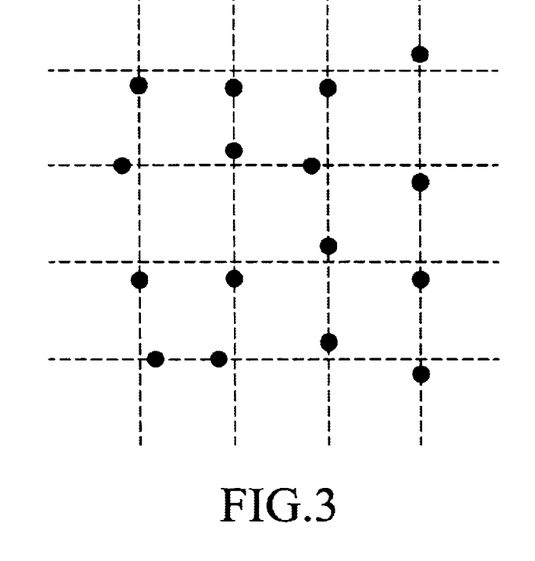
FIG. 3 is a schematic view of an example of 4×4 symbols that are used to code a position.

FIG. 3 shows an example of an image with 4×4 symbols which are read by a device for position determination.

These 4×4 symbols have the following values:

4 4 4 2
3 2 3 4
4 4 2 4
1 3 2 4

These values represent the following binary x- and y-code:

| x-code: | y-code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x-sequences code the following positions in the number series: 2 0 4 6. The differences between the columns will be −2 4 2, which modulo 7 gives: 5 4 2, which in mixed base codes position (5−3)×8+(4−3)×2+(2−1)=16+2+1=19. Since the first coded x-position is position 0, the difference which is in the range 1–2 and which is to be seen in the 4×4 symbols is the twentieth such difference. Since furthermore there are a total of three columns for each such difference and there is a starting column, the vertical sequence furthest to the right in the 4×4 x-code belongs to the 61st column in the x-code (3×20+1=61) and the one furthest to the left belongs to the 58th.

The horizontal y-sequences code the positions 0 4 1 3 in the number series. Since these series begin in the 58th column, the starting position of the rows are these numbers minus 57 modulo7, which yields the starting positions 6 3 0 2. Translated into digits in the mixed base, this will be 6–2, 3–2, 0–0, 2–2=4 1 0 0 where the third digit is the least significant digit in the number at issue. The fourth digit is then the most significant digit in the next number. In this case, it must be the same as in the number at issue. (An exceptional case is when the number at issue consists of the highest possible digits in all positions. Then one knows that the beginning of the next number is one greater than the beginning of the number at issue.)

The position of the four-digit number will then in the mixed base be 0×50+4×10+1×2+0×1=42.

The third row in the y-code thus is the 43rd which has the starting position 0 or 1, and since there are four rows in all on each such row, the third row is number 43×4=172.

Thus, in this example, the position of the uppermost left corner for the 4×4 symbol group is (58,170).

Since the x-sequences in the 4×4 group begin on row 170, the x-columns of the entire pattern begin in the positions of the number'series ((2 0 4 6)-169) modulo 7=1 6 3 5. Between the last starting position (5) and the first starting position, the numbers 0–19 are coded in the mixed base, and by adding up the representations of the numbers 0–19 in the mixed base, one obtains the total difference between these columns. A naive algorithm to do so is to generate these twenty numbers and directly add up their digits. The resulting sum is called s. The sheet of paper or writing surface will then be given by (5-s) modulo7.

In the example above, an embodiment has been described, in which each position is coded with 4×4 symbols and a number series with 7 bits is used. Of course, this is but an example. Positions can be coded with a larger or smaller number of symbols. The number of symbols need not be the same in both directions. The number series can be of different length and need not be binary, but may be based on another base. Different number series can be used for coding in x-direction and coding in y-direction. The symbols can have different numbers of values.

In the example above, the marking is a dot but may, of course, have a different appearance, such as a circle, square, rectangle, triangle, filled in or not filled in. For example, it may consist of a dash which begins in the virtual raster point and extends therefrom to a predetermined position.

In the example above, the symbols within a square partial surface are used for coding a position. The partial surface may have a different form, such as hexagonal. The symbols need not be arranged in rows and columns at an angle of 90° to each other but can also be arranged in some other manner. Other coordinate systems can be used, such as polar coordinates.

For the position code to be detected, the virtual raster must be determined. This can be carried out by studying the distance between different markings. The shortest distance between two markings must derive from two neighboring symbols having the value 1 and 3 so that the markings are located on the same raster line between two raster points. When such a pair of markings has been detected, the associated raster points can be determined with knowledge of the distance between the raster points and the displacement of the markings from the raster points. When two raster points have once been located, additional raster points can be determined by means of measured distances to other markings and with knowledge of the relative distance of the raster points.

Figure 4:
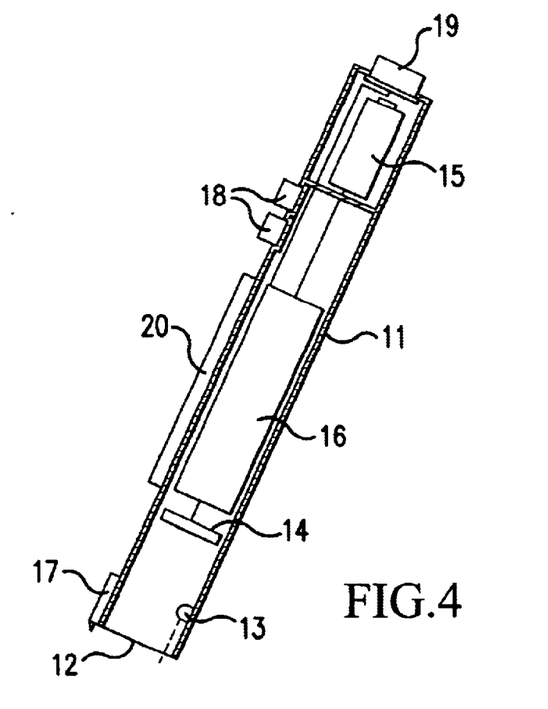
FIG. 4 is a schematic view of a device which can be used for position determination.

An embodiment of a device for position determination is schematically shown in FIG. 4. The device comprises a casing 11 having approximately the shape of a pen. In one short side of the casing there is an opening 12. The short side is intended to abut against or be placed a short distance from the surface on which the position determination is to be carried out.

The casing contains essentially an optics part, an electronic circuitry part, and a power supply.

The optics part comprises at least one light emitting diode 13 for illuminating the surface which is to be imaged and a light-sensitive area sensor 14, such as a CCD or CMOS sensor, for recording a two-dimensional image. The device may also comprise a lens system.

The power supply to the device is obtained from a battery 15 which is mounted in a separate compartment in the casing.

The electronic circuitry part comprises image processing means 16 for determining a position on the basis of the image recorded by the sensor 14 and more specifically a processor unit with a processor which is programmed to read images from the sensor and to carry out position determination on the basis of these images.

In this embodiment, the device also comprises a pen point 17, with the aid of which it is possible to write ordinary pigment-based writing on the surface upon which the position determination is to be carried out. The pen point 17 is extendable and retractable so that the user can control whether or not it is to be used. In certain applications, the device need not have a pen point at all.

Moreover, the device comprises buttons 18 by means of which the user activates and controls the device. It also comprises a transceiver 19 for wireless transfer, e.g. using IR light or radio waves, of information to and from the device. The device can also comprise a display 20 for showing positions or recorded information.

Applicant's Swedish Patent No. 9604008-4 describes a device for recording text. This device can be used for position determination if programmed in a suitable way. If it is to be used for pigment-based writing, it must also have a pen point.

The device can be divided into different physical casings, a first casing containing components required for capturing images of the position-coding pattern and for transferring them to components which are located in a second casing and which carry out the position determination on the basis of the recorded image or images.

As mentioned above, the position determination is carried out by a processor which thus must have software to locate and decode the symbols in an image and to determine positions on the basis of the thus obtained codes. A person skilled in the art can, starting from the example above, design software which carries out position determination on the basis of an image of part of a position-coding patterns.

Moreover, the skilled person can design, on the basis of the above description, software for printing the position-coding pattern.

In the above embodiment, the pattern is optically readable and, accordingly, the sensor is optical. As mentioned above, the pattern can be based on a parameter other than an optical parameter such as chemical, electromagnetic etc. Obviously, in that case the sensor must be of a type which can read the parameter in question.

In the above embodiment, the raster is a checked network. It can also have other forms.

In the above embodiment, the longest possible cyclic number series is not used. Thus, a certain amount of redundancy is provided which can be used, for example, to check the turning of the entered group of symbols.

The above pattern and pen can be used in the present invention.

Figure 5:
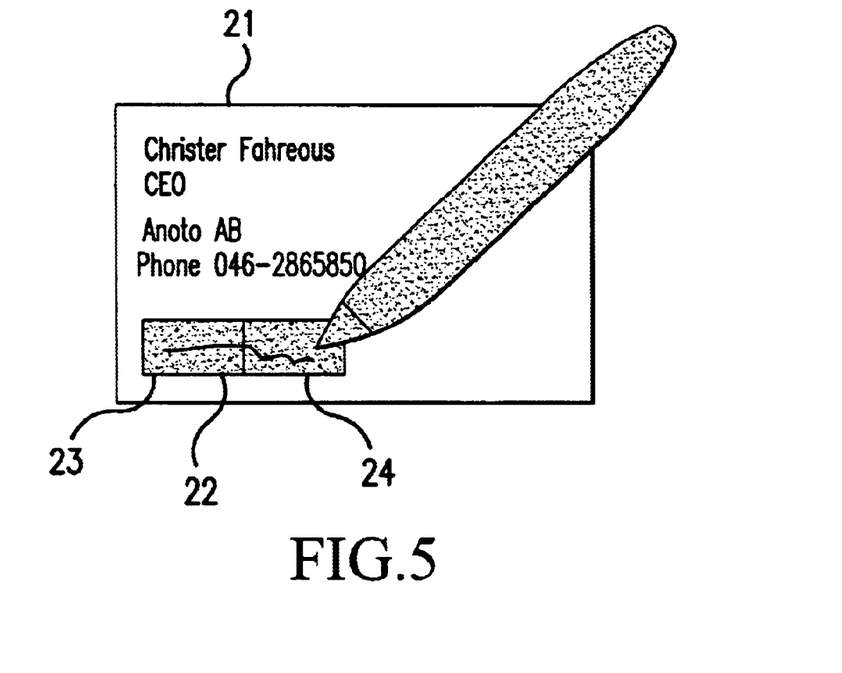
FIG. 5 is a schematic top plan view showing the front of a business card arranged according to the invention, with a reading pen for reading the pattern.
Figure 9:
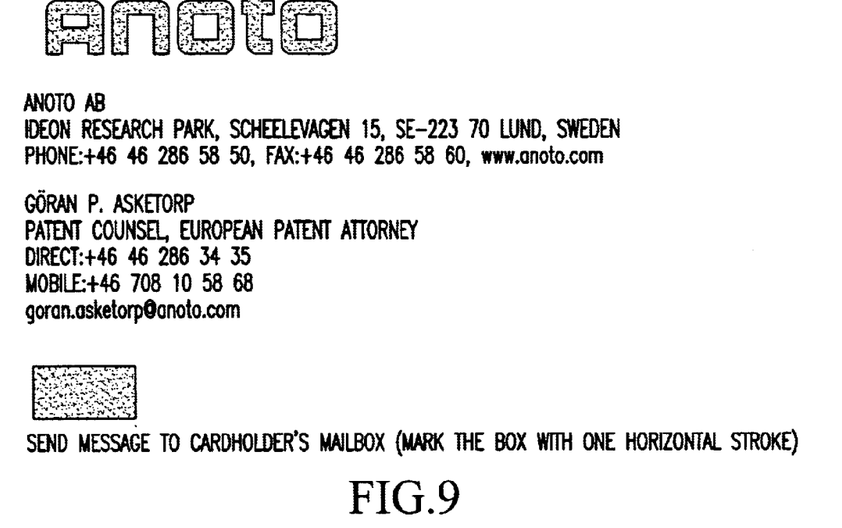
FIG. 9 is a top plan view showing the front of a complete business card corresponding to the embodiment according to FIG. 5.
Figure 10:
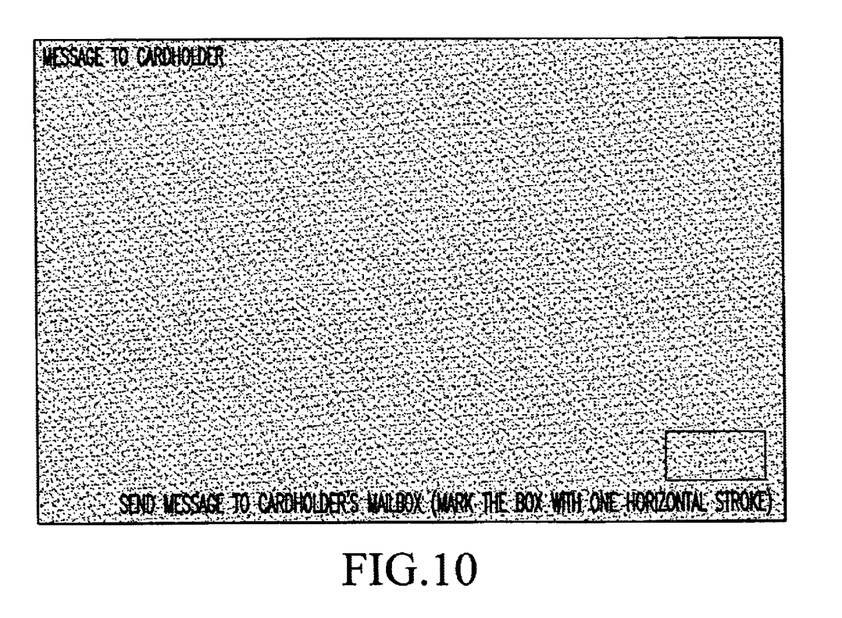
FIG. 10 is a top plan view showing the back of the card according to FIG. 9.

FIGS. 1 and 5 show the front of a business card 21, which usually has a well-defined size, for example 85×55 mm. The business card is provided with particulars about the card holder, such as name and address of the company, telephone and fax numbers, etc. as well as the card holder's particulars, such as name, title or function in the company, direct telephone, mobile phone, e-mail address etc. Moreover there is often a trademark, a logotype or a figurative mark, which serves to communicate a message. An example of a business card containing these particulars is shown in FIG. 9.

According to the invention, the front and/or the back of the business card is provided with a rectangle 22 containing a position-coding pattern which has been described in more detail above.

Briefly, the pattern consists of points or dots with a nominal spacing of 0.3 mm. Each point is displaced from its nominal position in one of four orthogonal directions, by 0.05 mm. A square containing 6×6 points jointly forms a geometric figure, with the aid of which it is possible to calculate a coordinate on a virtual surface by means of a calculating algorithm which has been described in more detail above. The calculation is floating so that a neighboring square, which is displaced by 0.3 mm or more in relation to the first square, codes a new coordinate.

With the reading pen, FIG. 4, the above-mentioned square with 6×6 points is read and the pen calculates the position on the virtual surface, i.e. the above-mentioned coordinate. The coordinates can be calculated with an accuracy of 0.3 mm, and with interpolation, the accuracy can be increased about 10 times.

The reading pen is provided with a preferably optical sensor which reads the pattern of points and a processor which performs some image processing and calculation of the coordinates. The coordinate values, usually x and y coordinates for the position of the pen, are forwarded by the pen via wireless transmission to a computer which executes measures in dependence on the coordinates.

The surface which can be coded by the coordinates is divided into several areas or domains, such as a functional domain containing areas which can be related to certain functions, and an identity domain which contains areas which can be related to people's identity. Moreover there is a general domain with areas for general use. The coordinates belonging to the functional domain are, at least in some areas, noticeable by the pen's processor and cause the pen to take certain measures, as will be explained below.

As mentioned above and as is evident from FIG. 5, the business card contains a rectangle 22 or button provided with the above-mentioned position-coding pattern. The button is divided into two areas 23 and 24, the left button 23 containing patterns within a predetermined coordinate area belonging to the functional domain, and the right button 24 containing patterns within a predetermined coordinate area belonging to the identity domain. The left half of the button 22 is adapted to be recognized by the pen's processor as a send button, which will be explained in more detail below. The right half of the button 22 is adapted to be an identity area which is unique to the business card holder, but the same for all business cards belonging to the business card holder.

The button 22 is intended to be used to send the business card holder's particulars in a .vcf file or .vcs file etc. to a business card holder which is the holder of the pen. The following sequence of activities then takes place:

When the business card recipient's pen is passed over the button 22 on the business card holder's business card, see FIG. 5, the pen records coordinates of the points located in the button 22. The pen is moved from the left to the right in FIG. 5 and records first the function area and then the identity area. In this case, the function area belongs to the domain indicating that the pen should transmit previously received information. A program in the pen is activated, which packets a data packet containing the following components: an identity of the pen, called pen ID, at least one coordinate from the send button area, and at least one coordinate from the identity area. This is the information that the pen has recorded up to the activation of the send button.

This data packet is sent by the pen via a wireless connection to a computer. The computer contains a recipient which receives the above data packet, and a program which interprets the data packet as follows: the program contains a database which associates the send button area with a program sequence which sends an e-mail to the pen holder, i.e. the business card recipient, containing the .vcf file belonging to the business card holder which is associated with the specific identity area. The pen ID and the identity area are in said database associated with specific individuals. By means of the database and the computer program, an e-mail can thus be put together with the business card holder's particulars and be sent to the business card recipient, by the e-mail address of the pen holder being inserted in the address line of the e-mail, and the business card holder's .vcf file is attached as an attachment, an attached file. The entire sequence is carried out without optical character recognition.

If desired, the program may also contain a program sequence which inserts the business card holder's e-mail address in the cc line or bc line of the e-mail, so that a copy of the e-mail is also sent to the business card holder. He thus receives a confirmation that his particulars or .vcf file has been sent to the pen holder, as well as the pen holder's e-mail address.

It goes without saying that the transfer from the pen to the computer may take place via the Internet in a manner which is well known in the art. Thus, the pen suitably comprises a Bluetooth transmitter which sends the data packet to a Bluetooth recipient within reach, for instance a mobile phone or a computer with a modem, which sends the data packet on via an Internet Service Provider (ISP) to a server or another computer connected to the Internet. The server may in turn send the data packet on to a personal computer, or itself perform the above-mentioned function.

The coordinate area which can be defined by the above-mentioned 6×6 matrix is very large and may contain an identity area for every person and company in the whole world. When a business card is to be printed, the business card holder is assigned a personal identity area which contains, inter alia, a pointer for his .vcf file.

The above-mentioned function requires that both the business card holder's identity area, and the associated .vcf file, and the pen holder's particulars, via the pen ID are stored in the database.

If the business card holder meets a recipient who does not have a pen and thus has no particulars stored in the database, the above simple function cannot be achieved.

Figure 6:
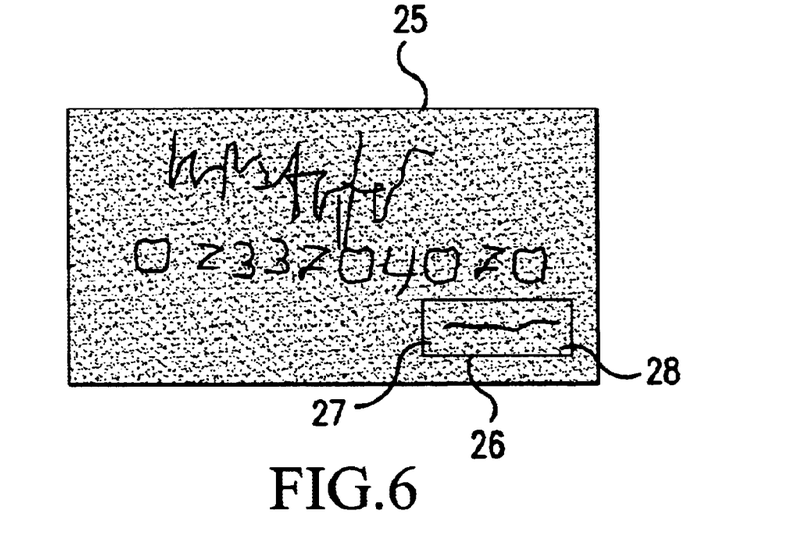
FIG. 6 is a top plan view showing the back of the business card according to FIG. 5.

Therefore the back of the business card is provided with increased functionality which will be explained with reference to FIG. 6.

In this case, it is assumed that the business card recipient does not have a pen with the above-mentioned functionality. However, the business card holder probably has such a pen or there is a colleague around who has such a pen. Thus an optional pen can here be used.

The back of the card is provided with the above-mentioned position-coding pattern over essentially the entire surface. The back comprises essentially two areas, one message field 25 and one send button 26 of the same type as the button 22 on the front. The send button is thus divided into a function area 27 and an identity area 28.

In order to send the business card holder's particulars to an optional recipient, the message field 25 is used to enter a fax number or an e-mail address as follows:

In the message field, an optional message is written by hand with the pen. In FIG. 6, "Kristofer 0733704070" has been written. When the, message is being written, the pen continually detects coordinates for the position of the pen by detecting with the sensor the pattern of points, e.g. 100 times per second. As a result, a sequence of coordinate points is recorded in the pen, corresponding to the path or sequence of movements that the pen has performed over the message field 25, i.e. a graph of the movements of the pen.

Subsequently, a stroke is made with the pen in the send button, so that the function area as well as the identity area are detected.

When the function area is detected, the pen puts together a data packet with the following information: pen ID, function area, identity area, and a number of coordinates in the message field which correspond to the graph passed by the pen, a so-called pen graph. The data packet is sent, as described above, to a computer or a server in a computer network, which contains a program which is capable of interpreting the above-mentioned data packet. Which program is used is determined by the function area to which the send button belongs.

The program then performs the following sequence of measures. The program passes through the pen graph and checks whether part of the pen graph, when subjected to intelligent character recognition, may be interpreted to be a sequence of digits corresponding to a fax number or a sequence of letters corresponding to an e-mail address. If a sequence of digits is found, this is interpreted as if a fax is to be sent to this fax number. The program then puts together a fax with the company and individual particulars which are available in a .vcf file associated with the identity area in the data packet and sends it to the fax number. At the same time, a second fax can be sent to the business card holder's fax number, said fax containing a reproduction of the pen graph (alternatively an e-mail, see below). If the intelligent character recognition finds an @ character, it interprets adjoining characters as an e-mail address and sends an e-mail to this address with the, business card holder's .vcf file as an attachment, and optionally at the same time with a copy, cc or bc, to the business card bolder. The e-mail to the business card holder can at the same time contain an image file as an attachment, containing the pen graph. If the intelligent character recognition fails, the program only sends an e-mail to the business card holder with an image file containing the pen graph. The business card holder can then open the image file and manually interpret the characters in the image file and manually send a fax or an e-mail to the recipient. A further alternative is that the image file is sent to a secretary function, which manually interprets the pen graph in the same way as the business card holder. The keyboard or address book of the mobile phone can also be used, as can also the equivalent of a PDA.

In order to facilitate intelligent character recognition, instructions can be available that the fax number or the e-mail address should be underlined or crossed out for intelligent character recognition to be tried. An alternative to underlining is to encircle the address with a rectangle or some other closed figure, such as an ellipse.

It may be advantageous that the address must be written in a special field which is predetermined to contain only address particulars, such as an e-mail address or a fax number. Such an area can consist of a "comb" which consists of partitions where only one letter or digit is to be written in each partition, as is often the case in connection with optical character recognition.

In certain circumstances, it is suitable for the processor of the pen to carry out the intelligent character recognition or at least parts thereof. The distribution of work between the processor of the pen and an external computer or server may be varied.

In the above examples, the send button is a combined rectangle with function area and identity area. The order of these buttons can be any order as long as the stroke which is made in the rectangle crosses both areas so that coordinates of both areas can be read. The function area and the identity area may consist of a single coordinate each, or of coordinate areas corresponding to a defined area.

The message field can belong to the identity area, in which case all coordinates in the field relate to the card holder. Alternatively the message field is an area from the general domain. Insertion into the data packet then takes place since the information is drawn immediately before activating the send box, i.e. between two activations of send boxes.

A further alternative is that the message field extends down in the send button so that activation of the send button links the send area, the identity area and the message area to each other.

Figure 7:
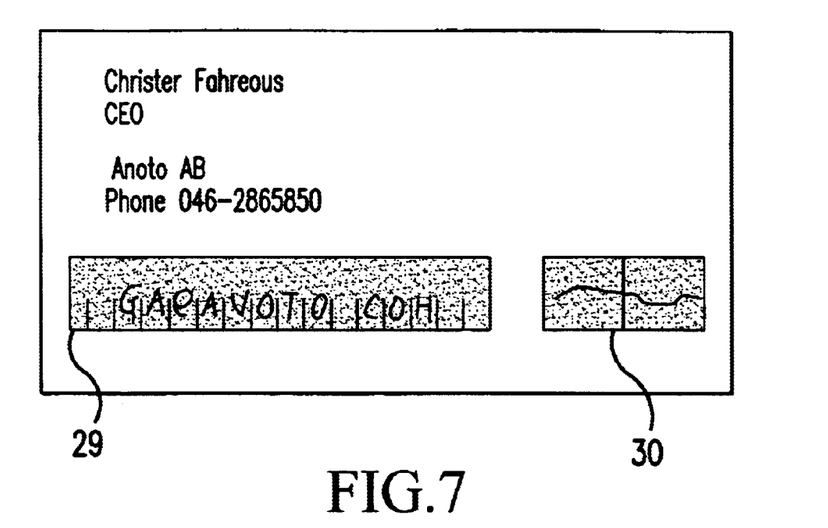
FIG. 7 is a schematic top plan view showing the front of a business card arranged according to the invention, with more functions than the business card according to FIG. 5.
Figure 8:
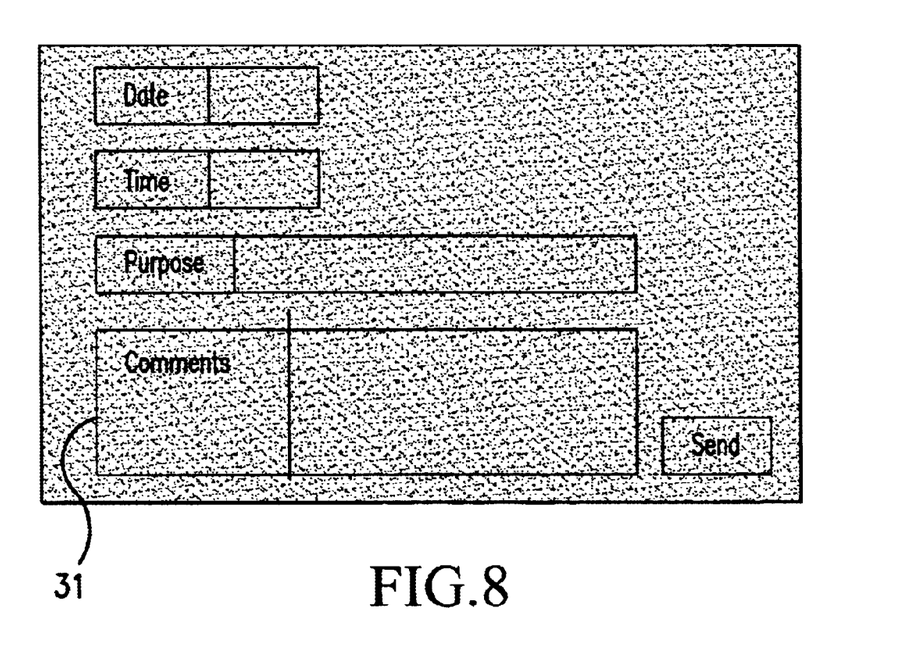
FIG. 8 is a top plan view showing the back of the business card according to FIG. 5.

FIG. 7 shows a business card provided with an address field 29 on the front and a send button 30 corresponding to the send button 22 described above. On the back, see FIG. 8, there is more space for notes and the like. FIG. 8 shows a simple form 31 with boxes for date, time, tasks and comments. The form can be used to state particulars of a meeting, or can be used by a dentist to state the next appointment. When the send button on the front or the back is activated, an e-mail or a fax is sent to the address stated on the front. If no address is stated on the front, the e-mail is sent to the pen holder's e-mail address, with a copy to the business card holder. An image file with the pen graph is attached. The form may comprise a connection to a computer program of the type Outlook or a database program used by dentists or a to-do list etc.

In a further alternative embodiment, the business card may comprise check boxes indicating whether additional information is to be included in the e-mail. An example is a check box for private address particulars, i.e. in addition to company address and phone number etc, also particulars about private address, phone number, e-mail address etc. will be sent. These private particulars need not be available on the physical business card, but must be stored in the database or be fetched by the server or the computer from a source. Check boxes may be available for other information, for instance that a special document is to be attached to the e-mail, such as product information or a standard type non-disclosure agreement etc.

Further functionality can relatively easily be integrated in the business card. An example is "non-dialed connection" to the business card holder. The business card recipient fetches the business card from his business card collection (or wallet) and wants to phone the business card holder. He takes his mobile phone and reads manually the phone number on the business card and enters it into his mobile phone. However there is a relatively great risk that something will be wrong, especially if the phone number is written with a small font, and it is dark or the business card recipient has difficulty in reading text that is close, which happens to many older people.

On the front the business card may comprise a phone number field, which when the pen is passed over the field causes the phone number to be transferred to the pen which then transfers it to the mobile phone, via wireless communication, after which the call is set up. Alternatively, the business card recipient presses the phone button on the mobile phone and the call is set up. The above-mentioned phone number field can belong to a so-called ASCII domain, with 128 or 256 areas, each connected to a single ASCII code. When the pen detects coordinates belonging to the ASCII domain, a program in the pen is activated which converts the coordinate or the area into an ASCII code. The phone number field then consists of a row of boxes, each provided with a pattern belonging to the corresponding ASCII area. The phone number field can be terminated with a function area which states that the preceding coordinates are to be interpreted by means of the ASCII domain and then sent to the mobile phone. It is also possible to use other types of codes, which can then be converted by the pen into a phone number. The function described above can be performed completely without using an external computer, only by communication between the pen and a mobile phone. The same principle can be used to interpret symbols of different types, which are included in a symbol domain. The symbol can then be printed on the corresponding area on the business card to give the user feedback about what he is doing.

By using a time stamp included in the pen, also information about the point of time when the business card was handed over can be included.

A certain degree of distribution of work between the pen's processor and an external computer or server has been mentioned above. Of course, part of the functionality which has been related to the server or computer can be carried out by the pen's processor and vice versa.

In the case where the pen holder is neither the business card holder nor the business card recipient but maybe a colleague of one to them, the same or similar particulars and information can be sent to all three parties.

The program activated by the function buttons can be determined by the coordinate or coordinates which are contained in the function buttons and which are detected. Alternatively, it is possible to enter a function into the function buttons, for instance "e-mail", which results in this function being carried out after intelligent character recognition by the pen or the computer or the server. In order to facilitate the recognition, easily recognizable symbols can be used instead, such as @ for e-mail.

Other types of reading pens as well as other types of codes, such as bar codes and corresponding reading pens, can also be used.

A few possibilities in connection with a business card according to the invention have been described above. It will be appreciated that the various functions can be combined in other ways than those illustrated in the drawings. Further possibilities are to be found in the concept in its entirety. For instance, a logotype can be attached to the e-mail or fax in order to further strengthen the identity in the message. The invention is only limited by the appended claims.

What we claim and desire to secure by Letters Patent is:

1. A business card comprising:
    a card surface;
    printed matter provided on said card surface and identifying particulars about a business card holder, such as company and/or personal particulars, and
    a position-coding pattern adapted to code at least one coordinate on a virtual surface, said coordinate being uniauely associated with and pointing to an electronic file representing said particulars.

2. A business card as claimed in claim 1 wherein said coordinate is a pointer to a storage position for said particulars in digital form, for example a .vcf file.

3. A business card as claimed in claim 2 wherein said virtual surface is divided into several domains, of which one domain is an identity domain which is divided into a plurality of identity areas, each corresponding to a business card holder.

4. A business card as claimed in claim 3, wherein said virtual surface further comprises a functional domain which comprises at least one send area,
    at least a portion of the position-coding pattern coding at least one coordinate corresponding to the send area.

5. A business card as claimed in claim 3 wherein said virtual surface further comprises a message domain, which comprises at least one message area,
    at least a portion of the position-coding pattern coding a coordinate area corresponding to the message area.

6. A business card as claimed in claim 3, wherein said virtual surface further comprises an address domain, which comprises at least one address area,
    at least a portion of the position-coding pattern coding a coordinate area corresponding to the address area.

7. A business card as claimed in any one of the preceding claims, wherein said particulars are selected from a group consisting of one or more of the following: the company's particulars, the business card holder's particulars, the business card holder's personal particulars, drawings or graphs drawn on the business card, files and documents.

8. A system for transferring information printed on a business card to a desired computer location, the business card as claimed in having the information printed thereon and being provided with a position code pattern including a unique identity code, the system comprising:
    a handheld position code reading unit, adapted to detect the position-coding pattern to determine the unique identity code;
    a computing device including a data base, the database including a representation of the unique identity codes associated with piural business cards and associated computer files having the information printed on its associated business card stored therein;
    the handheld unit including a communication device which is adapted to send a signal representing said unique identity code to the database to access the associated computer file having the information printed on its associated business card from the database.

9. A system as claimed in claim 8, wherein the handheld position code reading unit includes a communication device which interacts with said computing device, said computing device adapted to send the file to a business card recipient.

10. A system as claimed in claim 8, wherein one of said handheld position code reading unit and computing device identify the bearer of said handheld position code reading unit;
    said business card including a function code representing the function of sending the computer file containing said information printed on the business card to a remote computing device associated with the bearer of said handheld position code reading unit;
    said computing device sending the computer file containing said information printed on the business card to the computing device associated with the bearer of said handheld Position code reading unit in response to reading of said function code by said handheld position code reading unit.

11. A system as claimed in claim 8, wherein the card is provided with a function code representing the function of sending the computer file defined by said identity code to an address defined by the user;

reading the function code with the handheld reading device and determining the business card recipient to send said information to from an addressis defined by particulars which are inputted via an inputting device, such as a keyboard or a keypad of a mobile phone or a PDA.

12. A system as claimed in claim 9 wherein the handheld reading device is an electronic pen and is used to write the send address on a position code bearing portion of said card, said electronic pen recording the address of the business card recipient as information read during the writing of the address.

13. A system as claimed in any one of claim 11 wherein said handheld reading unit is an electronic pen and further information is applied to the business card by means of said pen and communicated to the business card recipient, optionally with a copy to the business card holder and/or the pen holder, by reading of a function code provided on said card.

14. A system as claimed in any one of claims 8–11 wherein said information includes at least one of the company's particulars, the business card holder's particulars, the business card holder's personal particulars, drawings or graphs drawn on the business card, files and documents.

15. The system of claim 8 wherein said database includes plural unique identity codes and associated business card information, the information including particulars of the cardholder in the form of a file such as a .vcf file.

16. The system of claim 8 wherein said position code is an absolute position code.

17. The system of claim 8 wherein the card is provided with a recipient address field and with a function code representing the function of sending the computer file defined by said identity code to the address defined by the recipient address field;

said handheld reading unit being and electronic pen used by a user to write an address in said address field;

said handheld reading unit reading said function code to cause said computer device to send said information to the address written in the address field.

18. A method of transferring information printed on a business card to a desired computer location, said method being used with an electronic handheld position reading system including a handheld unit reading position codes from a position code pattern provided on a supporting surface and supplying the pattern to a computing element for decoding the pattern to determine the position read by said handheld unit, the method comprising:

providing a position code on a surface of said business card, at least a portion of said position code being an identity position code uniquely specifying information printed on the business card;

associating a computer file containing said information printed on the business card with said identity position code using a handheld device to read the position code including the identity position code provided on said card;

providing said position code to a computing device; and using said position code as a pointer to the computer file containing the information printed on said card.

19. The method of claim 18 wherein said position code further includes a function position code, said method further comprising:

associating a function command with said function position code;

said step of using the handheld device to read the position code including reading the function position code; and performing a program function at least partially with said computing device as specified by said function code.

20. The method of claim 19 wherein said handheld device is registered in at least one of said handheld device and said computing device as being associated with its bearer;

said function position code specifying the function of sending the computer file containing said information printed on the business card to the registered bearer of said handheld device;

performing the function of sending the computer file containing said information printed on the business card to a computing device associated with the bearer of the handheld device in response to reading the function position code with said handheld device.

21. The method of claim 19 wherein said handheld device is an electronic pen;

said business card including a recipient address field;

said method further comprising the step of writing an address into said recipient address field with the electronic pen to identify a location of a recipient to receive said computer file;

said function position code specifying the function of sending the computer file containing said information printed on the business card to the recipient identified by said address provided in said recipient address field in response to reading by said handheld device.

22. The method of claim 21 wherein said method further comprises sending said computer file to the address specified by the recipient address field in response to reading said function position code with said handheld device.

23. The method of claim 21 wherein said business card further includes an additional information field;

said method further comprising writing additional information in said additional information field with said electronic pen and recording the associated position codes read by said pen within said pen before reading the function position code;

said step of reading said function position code instituting the transmission of said additional information to the address specified.

24. The method of claim 18 further comprising transmitting the computer file to the recipient of the business card.

25. The method of claim 18 wherein the position code is an absolute position code.

26. The method of claim 9 wherein said said computing device sends the file to the business card recipient in the form of an e-mail or a fax.

* * * * *